UNITED STATES PATENT OFFICE.

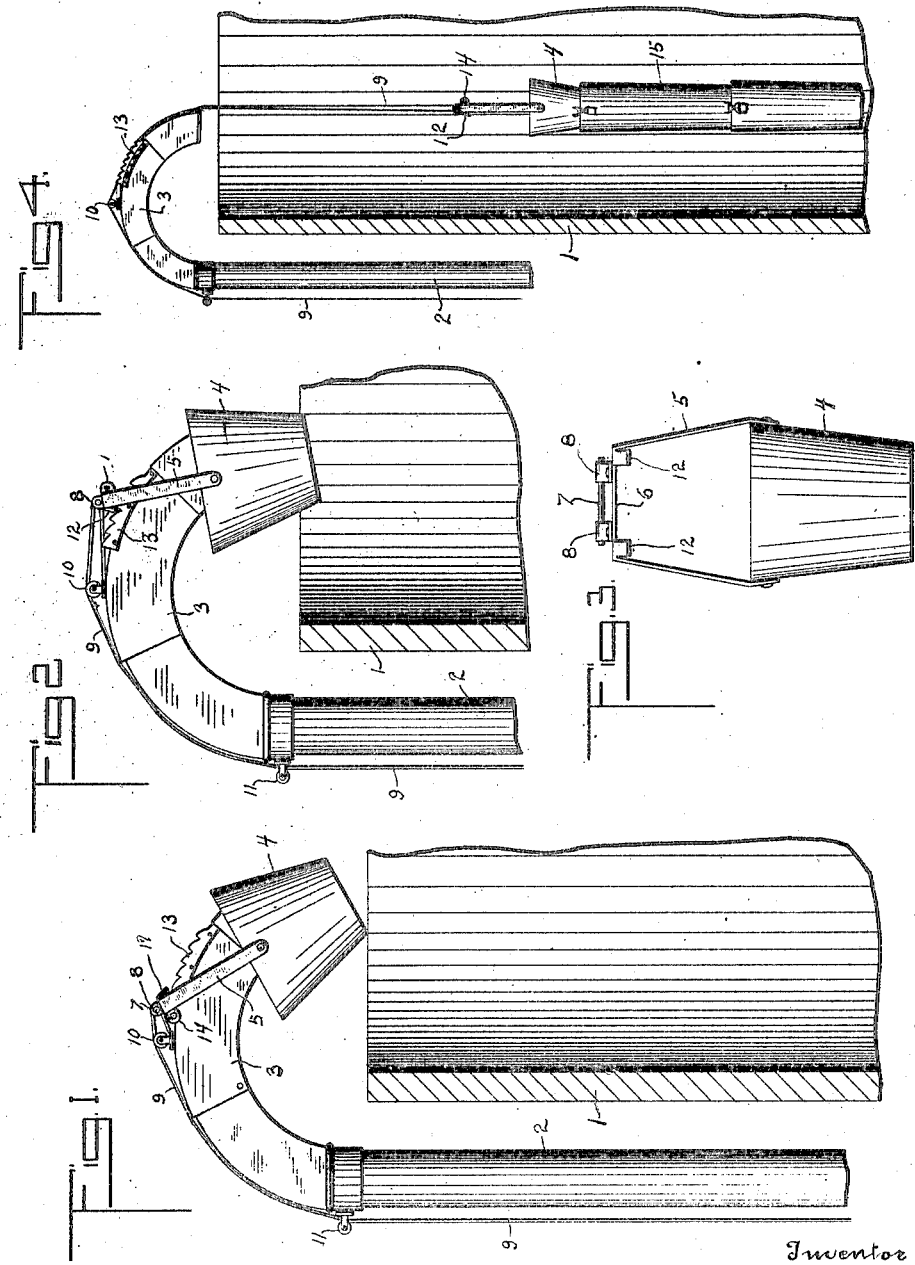

WILLIAM FITZPATRICK, OF WALTON, ILLINOIS.

DISTRIBUTING-PIPE FOR SILO-FILLERS.

1,284,081. Specification of Letters Patent. Patented Nov. 5, 1918.

Application filed September 21, 1917. Serial No. 192,475.

*To all whom it may concern:*

Be it known that I, WILLIAM FITZPATRICK, a citizen of the United States, residing at Walton, in the county of Lee and State of Illinois, have invented certain new and useful Improvements in Distributing-Pipes for Silo-Fillers, of which the following is a specification.

My invention pertains to silo fillers, and has reference more specially to improvements in the means for delivering the ensilage to the silo, and distributing the same therein.

One of the purposes of my invention is to provide a hopper for the delivery end of the hood of a blower pipe, which will be adjustable thereon to permit the hopper to be held in an elevated position on the hood when such hood is being inserted in the opening in the silo.

Another object is to provide for lowering the hopper to the bottom of the silo, on the inside, and raising the same again to a position on the hood, such operation being performed entirely from the ground. As at present manipulated considerable difficulty is encountered in attaching the various sections of distributer pipe, as they have to be hoisted up on the inside of the silo for a greater or less distance, the section which is connected with the hopper being hoisted to the top of the silo. By providing a hopper which can be lowered to a point near the bottom of the silo this difficulty can be overcome, as the sections of the distributer pipe can be successively connected up from the ground.

These and other features and advantages of my invention will more fully appear from the following specification, reference being had to the drawings accompanying the same, in which:

Figure 1 shows a section of the upper part of a silo, with the upper end of a blower pipe in position above the same. Fig. 2 is a similar view with some of the parts in a different position. Fig. 3 is a detached view of the hopper 4 and appurtenant parts. Fig. 4 shows a section of a silo with the hopper partially lowered therein.

1 represents a section of the upper part of a silo of cylindrical form, and 2 the upper end of a blower-pipe from a silo filler, to the upper end of which is attached a semi-circular hood 3. A hopper 4 provided with a bail 5 pivotally attached thereto, is slidable on the hood 3. On the cross-bar 6 of said bail is supported a roller 7, by means of loops 8 attached to the bar 6. Passing around the roller 7 is a rope 9, one end of which is connected with the hood near the upper part thereof, and the other end of which passes over a pulley 10 on the hood, and then downwardly under a roller 11 to a point convenient for operation on the ground.

At each end of the cross-bar 6, on one edge thereof, is a lug 12, adapted to engage one of a series of teeth 13 secured to the sides of the hood 3, and projecting a little above the same.

When the hood is first turned into an operative position in the opening of a silo the bail 5 is reversed, as shown in Fig. 1, so that the lugs 12 will not engage the teeth 13 in the downward movement of the hopper. By letting out the rope 9 the hopper can then be moved downwardly until it and the bail are freed from the hood, whereupon it can be lowered to any desired point in the silo, as shown in Fig. 4. To prevent the teeth 13 from engaging with the edge of the cross-bar 6 such bar is provided with a pair of guards 14, on the opposite side from the lugs 12, which guards bear against the upper face of the hood and hold the bar 6 out of contact with the teeth.

When the hopper 4 has been lowered to a point near the bottom of the silo the upper section 15 of the distributer pipe is attached thereto in the usual manner. The hopper is then elevated a sufficient distance to permit the connection of another section of pipe, and the operation is continued until a pipe of desired length is completed. The hopper 4 is then replaced in position on the hood, with the lugs 12 in engagement with the teeth 13, so as to hold the hopper at such a point with relation to the hood as is desired. As the quantity of material is gradually increased in the silo the sections of distributer pipe are disconnected and lowered to the ground in the usual manner. When the last section has been detached and the work of filling the silo is completed, the hopper 4 is reversed and again drawn upwardly on the hood to a point at which it will clear the silo wall, whereupon it is withdrawn and the pipe lowered.

It will be apparent that the operation of lowering the hopper into the silo and raising it again can be performed entirely by a person standing on the ground, by means of the rope 9. In case the hopper is twisted out of position when it is raised for connection with the hood, by the aid of the distributer pipe it can be turned into the desired position by an operator at the lower end of said pipe.

By having the hopper movable upon the hood it need not be disconnected when the hood is turned into position in the silo, but can turn with the hood, when elevated thereon.

What I claim as my invention, and desire to secure by Letters Patent of the United States, is:

1. In a device of the class described, the combination with the discharge pipe of a silo filler, and hood at the upper end thereof, of a hopper on the discharge end of said hood, a bail pivotally attached to said hopper and provided with ratchet engaging means; ratchets on said hood for engagement with said last-named means, adapted to hold said hopper in adjusted position; and means for raising and lowering said hopper.

2. In a device of the class described, the combination with the discharge-pipe of a silo filler, and hood on the upper end thereof, of a hopper movable on the discharge end of said hood and adapted to support a plurality of distributer sections; a bail pivoted to said hopper and provided with means for engagement with said hood, to support said hopper in operative position; means on said hood for the support of said bail; guards on said bail to prevent engagement with said hood when the bail is in inverted position; and means connected with said bail for raising or lowering said hopper.

In testimony whereof I affix my signature in the presence of two witnesses.

WILLIAM FITZPATRICK.

Witnesses:
  W. N. HASKELL,
  KATHRYN WOODBURN.

Copies of this patent may be obtained for five cents each, by addressing the "Commissioner of Patents, Washington, D. C."